May 2, 1933.    R. M. ROWELL    1,906,812
ELECTRICAL INSTRUMENT
Filed Dec. 16, 1931
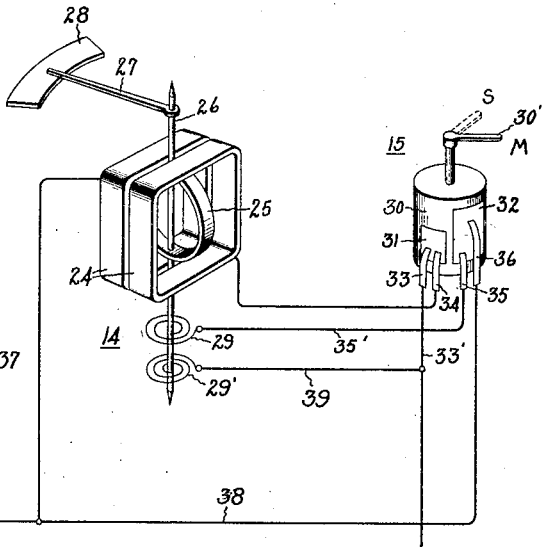
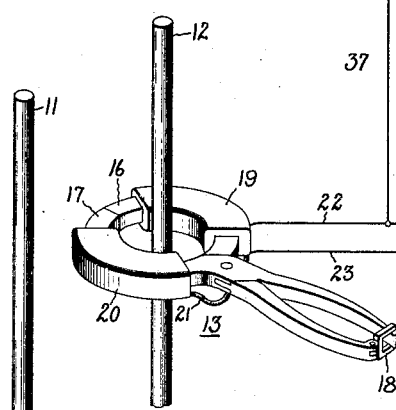
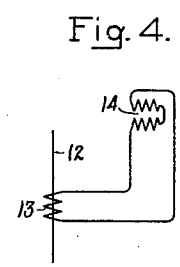
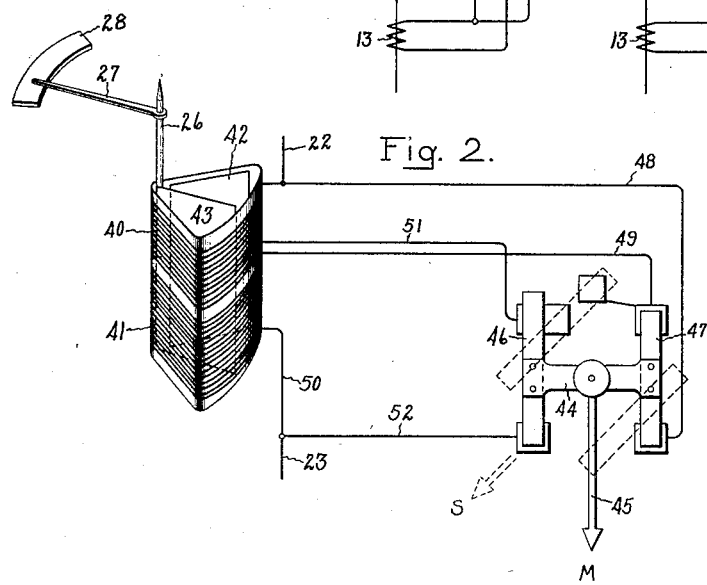
Inventor:
Ralph M. Rowell,
by Charles E. Mullan
His Attorney.

Patented May 2, 1933

1,906,812

UNITED STATES PATENT OFFICE

RALPH M. ROWELL, OF LYNN, MASSACHUSETTS, ASSIGNOR TO GENERAL ELECTRIC COMPANY, A CORPORATION OF NEW YORK

ELECTRICAL INSTRUMENT

Application filed December 16, 1931. Serial No. 581,329.

My invention relates to electrical instruments and concerns particularly arrangements for obtaining more than one range of operation from current transformers used with measuring instruments in alternating-current circuits.

In order to insulate the measuring circuit from the power circuit, and in order to utilize standard capacity measuring instruments for the measurement of large currents in alternating-current circuits, it has been customary to utilize current transformers. To obtain more than one range from the combination of a single transformer and current responsive instrument, the transformer may be provided with various taps or the instrument may be arranged for various connections in order to change the torque for a given current in the primary of the transformer. Either of these methods, however, is open to the objection that the ratio of transformation of the current transformer tends to change as the burden upon the transformer is changed by changing the taps or changing the connections of the measuring instrument. This effect becomes so marked in the case of split-core current transformers frequently used for cable testing or for use with portable instruments, that the accuracy is very greatly impaired. It is an object of my invention to provide an arrangement for obtaining more than one range of operation without loss of accuracy from current responsive instruments used with a split-core transformer or any other type of transformer subject to material changes in ratio with changes in the burden placed thereon. Other and further objects will become apparent as the description proceeds.

In accordance with my invention I provide a current responsive instrument of any suitable type with a plurality of windings arranged to be connectible in series or parallel combinations. The effect of the change in burden on the current transformer resulting from changing the connections of the instrument is overcome by selecting such relative numbers of turns for the windings of the instrument that the torque of the instrument will remain the same for values of primary current corresponding to full scale deflection even though the secondary currents are not the same for each connection.

The features of my invention which I believe to be novel and patentable will be pointed out in the claims appended hereto. However, my invention itself may be best understood by referring to the following description taken in connection with the accompanying drawing in which Fig. 1 represents one form of my invention in which a dynamometer type current responsive instrument is used; Fig. 2 illustrates a modification employing a magnetic vane type of instrument; Figs. 3 and 4 represents schematically for each range the connections of the windings of instruments used in accordance with my invention for two ranges of operation.

Referring now more in detail to the drawing in which like reference characters refer to like parts throughout, an alternating-current circuit is represented having conductors 11 and 12. The current transformer 13 and current responsive instrument 14 are arranged to obtain indications of the current flowing in the conductor 12. A transfer switch 15 is utilized to change the connections of the instrument 14 from series to parallel or vice versa in order to obtain two ranges of operation.

The transformer 13 is shown as being of the split-core type having core portions 16 and 17 so arranged that they may be separated by means of the handle 18 in order to permit placing the core around the conductor 12. It will be understood that in operation the portions 16 and 17 are retained together in order to make the reluctance of the magnetic path as small as possible. However, a relatively large leakage flux is inherent in a core construction of this kind. On this account the transformer ratio tends to change with changes in secondary burden. The secondary winding is also separated into two portions 19—20 joined by the lead 21 so that the two portions act as a single secondary winding. A pair of leads 22 and 23 is brought out for connection to the current responsive instrument 14.

In the arrangement shown in Fig. 1, the current responsive instrument comprises a stationary field winding composed of the coils 24 and an armature composed of the movable winding 25 carried by a shaft 26. The shaft 26 may be attached to an indicating pointer 27 cooperating with a scale 28 or it may also be connected to operate a recording device, movable contacts, or perform any of the well-known functions for which current responsive instruments are utilized. A pair of springs 29 and 29' is utilized to conduct the current to the movable coil 25 from stationary terminals. If the device is used as an indicating instrument, it will be understood that the hair springs 29 and 29' may be utilized also to bias the shaft to a given position or that an independent control spring may be employed.

Any type of switch suitable for changing a pair of windings from series to parallel connection may be employed but preferably the arrangement is such that the secondary windings of the current transformer 13 are not open circuited at any time during the transition from one position to another since dangerous voltages might be induced if the secondary circuit were opened under load. The switch 15 shown in Fig. 1 comprises a drum 30 controlled by a handle 30' and carrying contact segments 31 and 32. The contact segments cooperate with stationary contacts 33 to 36. When the handle is in the position shown at the point marked M the windings of the instrument 14 are connected in multiple, but in order to connect the windings in series the handle is moved to the position marked S. With the windings in multiple, the circuit is represented by Fig. 3; with the windings in series the circuit is represented by Fig. 4.

With the handle at the position M, two circuits are formed from one lead 22 of the transformer 13 to the return lead 23. One circuit is from lead 22 through conductor 37, stationary winding 24 of the instrument 14, contact 34, contact segment 31, contact 33, and conductor 33', back to lead 23. The second circuit is formed from lead 22 through conductor 38, contact 36, drum segment 32, contact 35, conductor 35', hair spring 29, movable coil 25, hair spring 29', conductor 39, back to lead 23 of the current transformer.

When the drum switch is turned to the position S a single circuit is formed from lead 22 of the current transformer through conductor 37, stationary winding 24 of the instrument 14, contact 34, drum segment 31, contact 35, conductor 35', hair spring 29, coil 25, hair spring 29', conductor 39, back to lead 23 of the current transformer 13. In moving the switch from the position M to the position S it will be seen that the leads 22 and 23 are not disconnected from the stationary coil 24 at contact 33 until the series circuit has been closed through contacts 34 and 35 so that at no time is there an open circuit in the secondary winding of the current transformer.

In order to facilitate the explanation of the theory of operation of my invention, the explanation will be made with reference to a transformer having a specific rating and characteristics and with reference to a current responsive instrument suitable for use with such a transformer, but it will be understood that my invention is not limited to devices of any given rating, characteristics, or ratio between operating ranges, and that the numerical values assigned are merely illustrative and need not be adhered to in carrying out my invention. For the sake of explanation, Fig. 1 represents an arrangement responsive to currents in conductor 12 ranging from 0 to 250 amperes or from 0 to 500 amperes depending on the connection employed. The nominal values of the secondary current are 5 amperes when the conductor carries a current of 250 amperes and 10 amperes when the conductor carries 500 amperes. Instrument 14 is designed to produce full scale torque with the series connection of windings when the current in conductor 12 is 250 amperes and with the parallel connection when the current in conductor 12 is 500 amperes. If the transformer ratio remained constant the secondary currents would actually be 5 amperes and 10 amperes respectively. Owing to the increased burden of the series connection of the instrument, however, if the specific transformer 13, here described, is designed to produce a secondary current of 10 amperes with the multiple connection of the instrument and a full scale current of 500 amperes flowing in conductor 12 it will produce only 4.45 amperes instead of 5 amperes with the instrument connected in series and a full scale current of 250 amperes flowing in conductor 12.

Normally, a dynamometer type instrument suitable for two ranges might have a field of 32 turns and an armature of 36 turns, the size of the coils being such that the impedances would be nearly balanced and the current would split equally when the armature and field are connected in multiple. However, in order to compensate for the change in ratio of the current transformer the relative number of turns is changed, for example, to 24 field turns and 44 armature turns. Since the impedance is proportional to the square of the number of turns, the current will divide unequally and 7.27 amperes will flow through the field and 2.73 amperes through the armature.

$7.27 \times 24 = 174.5$ ampere turns in the field
$2.73 \times 44 = 120$ ampere turns in the armature $120 \times 174.5 = 20,950$. This represents the torque of the multiple combination, since the torque of a dynamometer type instrument is proportional to the currents flowing in each member and to the number of turns of each member.

When connected in series the current is of course the same in both field and armature. However, as previously explained, owing to the increased burden on the current transformer the full scale value of current will be only 4.45 amperes.

4.45×24=106.8 ampere turns in the field
4.45×44=196 ampere turns in the armature
196×106.8=20,940.

This represents the torque of the series combination and is almost identical with that of the multiple combination thus compensating for inherent transformer error and giving a full scale deflection of the instrument 14 for the full scale value of current in conductor 12 for either connection of the instrument. In brief, the compensation is effected by causing the torque per ampere of the instrument to be different for different connections.

In Fig. 2 I have shown another type of current responsive instrument, a type which forms no part of my invention but which is representative of a numerous class of instruments in which the torque is produced by currents flowing only in a stationary winding. The stationary winding is divided into two portions 40 and 41. For clearness, the two portions 40 and 41 are shown as occupying separate portions of the winding form, but it will be understood that I am not limited to this exact arrangement. In the specific type of instrument shown the windings 40 and 41 are sector-shape and set up a repulsion between a stationary soft iron vane 42 and a movable soft iron vane 43. Vane 43 is attached to the shaft 26 of a device which may take the form of an indicating instrument, recorder, contact-making instrument, or the like. As in the arrangement shown in Fig. 1, the windings 40 and 41 are arranged so that they may be connected either in series or in parallel. The leads 22 and 23 may be connected to any suitable type of current transformer, for example one of the type shown in Fig. 1.

The sector coil type instrument is shown with another type of transfer switch but it will be understood that my invention does not depend upon employing any specific method of transferring from series to parallel connections or vice versa. The switch here shown comprises an insulating cross piece 44 carrying an indicating pointer 45 and bridging contacts 46 and 47. With the pointer in the position M, two circuits are formed between transformer leads 22 and 23. The first circuit is from lead 22 through conductor 48, movable contact 47, conductor 49, through winding 41, conductor 50, to transformer lead 23. The second circuit is from transformer lead 22 through winding 40, conductor 51, movable contactor 46, and conductor 52, back to transformer lead 23. With the pointer 45 in the position S, a single circuit is formed from the transformer lead 22 through winding 40, conductor 51, movable contact 46, conductor 49, winding 41, conductor 50, back to transformer lead 23. Although I have illustrated the use of two of the principal types of current responsive instruments in connection with my invention, it will be understood that my invention is not limited thereto but may be carried out with any form of current responsive instrument capable of having its windings separated into more than one portion.

The instrument shown in Fig. 2 differs from that as shown in Fig. 1, in that the currents flow in the stationary member only and consequently the torque, is dependent upon the sum of the ampere turns produced in widings 40 and 41 instead of the product of the ampere turns of windings 24 and 25 in the dynamometer type of instrument.

Accordingly, the exact ratio between the number of turns of windings 40 and 41 would not necessarily be the same as in the dynamometer type of instrument even if the two instruments are used with the same current transformer.

The operation of the sector type of instrument will be explained as used with a representative 125/250 ampere transformer having such a ratio that the secondary currents are nominally 2.5 and 5 amperes respectively. However, in changing the instrument connections from parallel to series, the actual ratio of the specific transformer referred to is reduced to about 14%. In order to compensate for this change in ratio, the instrument is divided into two portions having for example 76 and 134 turns respectively. The impedances of the two sections are proportional to the squares of the number of turns. Accordingly, for the parallel connection there is a current of 3.78 amperes in the 76-turn coil and 1.22 amperes in the 134-turn coil, giving a total current of 5 amperes in the secondary of the transformer.

1.22×134=164 ampere turns
3.78×76=287 ampere turns
287+164=451 ampere turns
corresponding to a full scale reading.

With the series connection owing to the decrease in ratio of the transformer, the secondary current is only 2.15 instead of the nominal value of 2.5 amperes. 2.15×210=451.5 ampere turns corresponding to full scale deflection for the series connection. The torque of this type of instrument obviously depends upon the magneto-motive force or the ampere turns of the winding. Consequently, it will be seen again that the torque corresponding to full scale current flowing in the primary of the transformer is practically identical for either connection of the current responsive instrument. Although for the sake of simplicity I have explained only arrangements for obtaining two ranges of measurement, it will be understood that my invention is not limited thereto and that by a suitable choice of a relative number of turns and the division of the windings of the instrument into a greater number of parts, suitable parallel, series and series parallel combinations may be obtained to give a plurality of ranges to compensate for changes in the transformer ratio with changes of secondary burden. Obviously my invention is not limited to ammeters but may also be applied to the current coils of wattmeters, power factor meters, and other devices responsive wholly or in part to alternating currents.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other arrangements.

What I claim as new and desire to secure by Letters Patent of the United States, is:

1. In combination, a current transformer and a current-responsive instrument arranged for double range operation, said transformer having a winding connected to said instrument and said instrument having a pair of windings connectible in parallel for one range of operation and in series for the other range, the relative numbers of turns being such that a difference in transformer ratios for the two connections is compensated for by a change in the torque per ampere of the instrument.

2. In combination, a current transformer and a current-responsive instrument arranged for more than one range of operation, said transformer having a winding connected to said instrument and said instrument having a plurality of windings arranged to permit a suitable connection for each range of operation, the relative numbers of turns of the windings being such that a difference in transformer ratios for different connections is compensated for by a corresponding change in the torque per ampere of the instrument.

3. In combination, a current transformer and a dynamometer type current-responsive instrument arranged for double range operation, said transformer having a winding connected to said instrument, said instrument having a field winding and an armature winding connectible in parallel for one range of operation and in series for the other range of operation, the relative numbers of turns and the resultant current distribution between windings being such that a difference in transformer ratios for the two connections is compensated for by a change in the product of the currents in the two windings of the instrument.

4. In combination, a current transformer and a vane-type current-responsive instrument arranged for double range operation, said transformer having a winding connected to said instrument, said instrument having a pair of field coils connectible in parallel for one range of operation and in series for the other range, the relative numbers of turns being such that a difference in transformer ratios for the two connections is compensated for by a change in the torque per ampere of the instrument.

5. In combination, a split-core current transformer and a current-responsive instrument arranged for double range operation, said transformer having a winding connected to said instrument, said instrument having a pair of windings connectible in parallel for one range of operation and in series for the other range of operation, the relative numbers of turns being such that a difference in transformer ratios for the two connections is compensated for by a change in current distribution between the two instrument windings to give a change in the torque per ampere of the instrument.

6. In combination, a current transformer and a current-responsive instrument arranged for double range operation, said transformer having a winding connected to said instrument to form a measuring circuit, said instrument having a pair of coils connectible in parallel for one range of operation and in series for the other range, and means for changing from one connection to the other without opening said measuring circuit, the relative numbers of turns of the instrument windings being such that a difference in transformer ratios for the two connections is compensated for by a change in the torque per ampere of the instrument.

7. In combination with an alternating-current circuit, means responsive to the current in one of the conductors thereof comprising a current transformer and a current-responsive instrument arranged for double-range operation, said transformer having a split-core surrounding said conductor, and a winding connected to said instrument, said instrument having a pair of windings connectible in parallel for one range of operation and in series for the other range, the relative number of turns of said instrument windings being such that a difference in transformer ratios for the two connections is compensated for by a change in the torque per ampere of the instrument.

In witness whereof I have hereunto set my hand.

RALPH M. ROWELL.